May 21, 1929.  H. T. STOKES  1,714,053
CONNECTING LINK
Filed Aug. 8, 1927
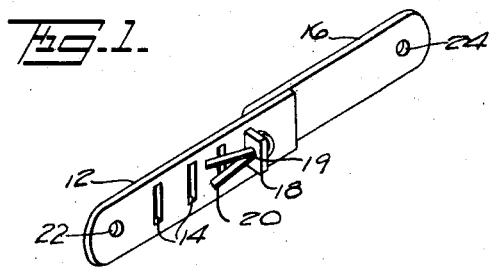
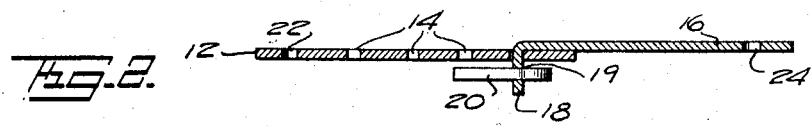
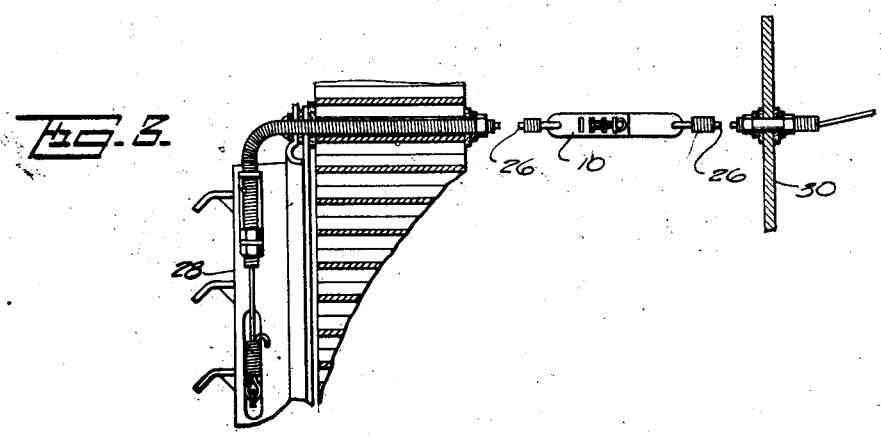
INVENTOR
Harlow T. Stokes
BY
Dyke and Schaines
ATTORNEYS Patented May 21, 1929.

1,714,053

UNITED STATES PATENT OFFICE.

HARLOW T. STOKES, OF BROOKLYN, NEW YORK, ASSIGNOR TO METAL STAMPING COMPANY, OF LONG ISLAND CITY, NEW YORK, A CORPORATION OF NEW YORK.

CONNECTING LINK.

Application filed August 8, 1927. Serial No. 211,410.

My invention relates to connecting links, and more particularly to connecting links which are adjustable and can be readily disconnected or dismantled. Connecting links in accordance with my invention are interposed in the cable line or other connecting means between a control member and a device controlled thereby and located at a distance from said control member, and provide a convenient place for disconnecting or parting the cable line in order to get it out of the way or for other purposes.

For example, radiator shutters, chokes, carburetor adjusters and similar devices, located at remote parts of an automobile and controlled from the dashboard of the automobile, make use of wire cables or other linkages to connect the device to its control member. In use, such cables or other connecting means become slack and stretch and it is necessary from time to time to shorten the cable or in other ways take up the slack so that the devices may be controlled to function properly. It is a feature of the present invention to provide a link which can be quickly and easily adjusted, will not disengage accidentally, and will keep the cable or other connecting means at the proper operating tension at all times.

Such cable lines very frequently pass underneath the automobile engine hood and across the engine, thereby detracting from its accessibility and constituting an impediment when repairs, adjustments, etc., are to be made to the engine or to the mechanism across which such cable lines extend. If it is desired to make repairs, it is first necessary to either cut such cable wires or disconnect the devices in order to get at the parts to be repaired, and to reassemble the devices and reunite the cables after the repairs have been made. The link of the present invention is designed to overcome these difficulties, and is so constructed that it may be disconnected by the removal of a simple fastener, such as a cotter pin or the like, without the necessity of cutting the cable or disconnecting the devices controlled thereby, whereupon the cable is parted and may be bent out of the way so that access may be had to the parts to be repaired. After the repairs have been made, it is simply necessary to engage the male and female members of the connecting link, and replace the cotter pin or other fastener, whereupon the cable is reunited and the device actuated thereby is instantaneously ready to function as before.

The drawings illustrate an embodiment of the invention shown for the purpose of illustration and for affording an understanding of the invention, and in said drawings, Fig. 1 is a perspective view of a connecting link in accordance with the present invention, Fig. 2 is a cross-sectional view thereof, and Fig. 3 is a side elevational view showing a connecting link of the present invention installed in the cable line to operate an automobile radiator shutter.

The connecting link, generally designated by reference character 10, preferably comprises a female member 12 provided with a plurality of transverse slots or holes 14, and a male member 16 having an ear 18 to enter one or another of said slots 14 of the female member. Said slots 14 are preferably of a size large enough to receive the ear 18 so that same has a tight fit in said slots. In this way, sidewise movement of the members 12 and 16 relative to each other is substantially prevented and the link when assembled is practically rigid. Ear 18 is provided near its end with an aperture 19. Said male and female members 12 and 16 are held in locked engagement by a fastener 20, such as a cotter pin or the like, inserted through the aperture 19 of the ear 18 projecting through slot 14, whereby the connecting link 10 is locked together and cannot become disengaged without first removing the fastener 20. The male and female members 12 and 16 are also provided with means, such as apertures 22, 24, for connection to a cable or other connecting linkage.

Fig. 3 shows the connecting link 10 interposed in the cable line 26 for operating the automobile radiator shutter 28, which is controlled by a control member located on the dashboard 30 of the automobile.

To adjust the connecting link 10, it is simply necessary to remove the cotter pin 20, move the ear 18 of the male member 16 out of the slot 14 in which it is engaged, move it into whichever slot will give the desired cable tension, and replace the cotter pin 20. If it is desired to part the cable 26, it is simply necessary to remove the cotter pin 20, disengage the male and female members of the link, and move the parts of the parted cable out of the way, each end of the parted cable having attached thereto one of the link members.

As is apparent from the above description, the connecting link of the present invention is very simple to put on and take off, is very valuable as a cable tension adjuster, is a convenient means for parting the cable line without any trouble or loss of time, will not get out of order and is inexpensive.

I claim:

1. A connecting link comprising a pair of substantially flat coacting members, one of said members being provided with a plurality of transverse slots and the other member having an apertured transverse lug adapted to enter any one of said slots with the apertured portion of said lug projecting from said slot, and a fastener adapted to be placed in said aperture to hold the two members in locked engagement, the slots in the first-named member being only large enough to receive the lug of the second-named member, whereby relative sidewise movement of the two members is substantially prevented.

2. A connecting link comprising a pair of substantially flat coacting members, one of said members being provided with a plurality of transverse slots and the other member having an apertured transverse lug adapted to enter any one of said slots with the apertured portion of said lug projecting from said slot, a fastener adapted to be placed in said aperture to hold the two members in locked engagement, and apertures on both ends of said link for connecting same to a cable line or the like, the slots in the first-named member being only large enough to receive the lug of the second-named member, whereby relative sidewise movement of the two members is substantially prevented.

In testimony whereof, I have signed my name hereto.

HARLOW T. STOKES.